(12) United States Patent
Matera et al.

(10) Patent No.: US 11,723,328 B2
(45) Date of Patent: Aug. 15, 2023

(54) CLEANING APPARATUS FOR USE WITH A PLANT SUPPORT TOWER

(71) Applicant: MJNN, LLC, South San Francisco, CA (US)

(72) Inventors: Matthew Matera, San Francisco, CA (US); Brice Klein, San Francisco, CA (US); Tamara Hasoon, Redwood City, CA (US); Merritt Jenkins, San Francisco, CA (US); Andrew Dubel, Pacifica, CA (US); Michael Peter Flynn, Palo Alto, CA (US)

(73) Assignee: MJNN LLC, South San Francisco, CA (US)

( * ) Notice: Subject to any disclaimer, the term of this patent is extended or adjusted under 35 U.S.C. 154(b) by 607 days.

(21) Appl. No.: 16/406,536

(22) Filed: May 8, 2019

(65) Prior Publication Data
US 2020/0352122 A1 Nov. 12, 2020

(51) Int. Cl.
*A01G 31/06* (2006.01)
*A01G 9/24* (2006.01)
*A01G 9/02* (2018.01)

(52) U.S. Cl.
CPC ........... *A01G 31/06* (2013.01); *A01G 9/24* (2013.01); *A01G 9/022* (2013.01)

(58) Field of Classification Search
CPC ........ A01G 31/06; A01G 9/022; A01G 9/023; A01G 9/06; B08B 1/002; B08B 1/005;
(Continued)

(56) References Cited

U.S. PATENT DOCUMENTS 1,263,836 A * 4/1918 Ball .................. B08B 9/023
29/81.02
1,709,860 A 4/1929 Lovett
(Continued)

FOREIGN PATENT DOCUMENTS

CN 2441299 Y 8/2001
CN 204616518 U 9/2015
(Continued)

OTHER PUBLICATIONS

U.S. Appl. No. 62/742,751, filed Oct. 8, 2018, Yara Thomas.
(Continued)

*Primary Examiner* — Trinh T Nguyen
(74) *Attorney, Agent, or Firm* — Almanac IP Advisors LLP

(57) ABSTRACT

A hydroponic tower cleaning and debris removal system is provided that is configured to automatically clean and remove plant and material debris from within a hinged, hydroponic tower as well as the plant containers contained within such a hydroponic tower. The hydroponic tower cleaning system utilizes a drive system to force the tower through the apparatus; an alignment system to ensure that the tower remains in proper alignment throughout the cleaning process; a brush system that initiates separation of plant debris from the tower/plant containers and ensures that the plant roots are torn apart; a plunger system to eject plant debris from within the plant containers; an air delivery system to blow away the debris; and rollers to maintain tower face alignment during the cleaning process.

16 Claims, 14 Drawing Sheets

(58) Field of Classification Search
CPC .... B08B 1/02; B08B 1/04; B08B 5/02; B08B 5/03; B08B 7/024; B08B 9/02; B08B 9/023; B08B 9/027; B08B 9/04; B08B 5/023; B08B 5/026; B08B 7/022
See application file for complete search history.

(56) References Cited

U.S. PATENT DOCUMENTS

| | | | |
|---|---|---|---|
| 2,242,304 A | 5/1941 | Johnson | |
| 2,842,920 A | 7/1958 | Carkhuff et al. | |
| 3,254,448 A | 6/1966 | Othmar | |
| 3,299,615 A | 1/1967 | Singer | |
| 3,896,587 A | 7/1975 | Insalaco | |
| 4,033,072 A | 7/1977 | Kobayashi et al. | |
| 4,075,785 A | 2/1978 | Jones | |
| 4,454,684 A | 6/1984 | O'Hare | |
| 4,569,150 A | 2/1986 | Carlson et al. | |
| 4,683,674 A | 8/1987 | Faul | |
| 4,992,942 A | 2/1991 | Bauerle et al. | |
| 5,031,359 A | 7/1991 | Moffett | |
| 5,249,406 A | 10/1993 | Kalmanides | |
| 5,251,399 A | 10/1993 | Rasmussen | |
| 5,363,594 A | 11/1994 | Davis | |
| 5,555,676 A | 9/1996 | Lund | |
| 5,584,408 A | 12/1996 | Orkisz | |
| 5,687,543 A | 11/1997 | Lam | |
| 5,841,883 A | 11/1998 | Kono et al. | |
| 5,913,477 A | 6/1999 | Dean | |
| 5,918,416 A | 7/1999 | Ammann, Jr. | |
| 5,934,017 A | 8/1999 | Ho | |
| 6,477,805 B2 | 11/2002 | Ware | |
| 7,143,544 B2 | 12/2006 | Roy | |
| 7,171,782 B2 | 2/2007 | Felknor et al. | |
| 7,373,753 B1 | 5/2008 | Caruso | |
| 8,184,570 B2 | 5/2012 | Chun et al. | |
| 8,250,804 B2 | 8/2012 | Chang | |
| 8,327,582 B2 | 12/2012 | Storey | |
| 8,365,466 B1 | 2/2013 | Storey | |
| 8,418,403 B1 | 4/2013 | Nuttman | |
| 8,761,769 B2 | 6/2014 | Carpenter | |
| 8,800,252 B2 | 8/2014 | Vodonos et al. | |
| 8,867,666 B2 | 10/2014 | Kim et al. | |
| 8,919,041 B2 | 12/2014 | Topping | |
| 8,966,819 B1 | 3/2015 | Cosmann | |
| 9,374,952 B1 | 6/2016 | Cross | |
| 9,374,953 B2 | 6/2016 | Martin et al. | |
| 9,742,577 B2 | 8/2017 | Cai | |
| 9,814,186 B2 | 11/2017 | Anderson et al. | |
| 10,022,873 B2 | 7/2018 | Larrea-Tamayo et al. | |
| 10,123,494 B2 | 11/2018 | Janssen | |
| 10,499,575 B2 | 12/2019 | Stoltzfus et al. | |
| 10,694,689 B2 | 6/2020 | Klein et al. | |
| 10,701,875 B2 | 7/2020 | Klein et al. | |
| 10,729,081 B2 | 8/2020 | Klein et al. | |
| 10,736,285 B2 | 8/2020 | Smith et al. | |
| 2003/0043764 A1 | 3/2003 | Kim et al. | |
| 2003/0089037 A1 | 5/2003 | Ware | |
| 2005/0083977 A1 | 4/2005 | Moulsley et al. | |
| 2005/0132666 A1 | 6/2005 | Dyke et al. | |
| 2006/0092973 A1 | 5/2006 | Petrovic et al. | |
| 2006/0156624 A1 | 7/2006 | Roy et al. | |
| 2008/0025240 A1 | 1/2008 | Casaccia et al. | |
| 2008/0078118 A1 | 4/2008 | Bissonnette et al. | |
| 2008/0302010 A1 | 12/2008 | Cordon | |
| 2009/0199470 A1 | 8/2009 | Capen et al. | |
| 2009/0223126 A1 | 9/2009 | Garner et al. | |
| 2010/0130219 A1 | 5/2010 | Cave et al. | |
| 2010/0146855 A1 | 6/2010 | Ma | |
| 2011/0083362 A1 | 4/2011 | Rosenberg | |
| 2011/0107667 A1 | 5/2011 | Laurence et al. | |
| 2013/0152468 A1 | 6/2013 | Huang et al. | |
| 2014/0000162 A1 | 1/2014 | Blank | |
| 2014/0130414 A1 | 5/2014 | Storey | |
| 2014/0259904 A1 | 9/2014 | Collard | |
| 2014/0290137 A1 | 10/2014 | Nagels et al. | |
| 2015/0300011 A1 | 10/2015 | Otamendi | |
| 2015/0313104 A1 | 11/2015 | Cottrell | |
| 2015/0334930 A1 | 11/2015 | Stoltzfus et al. | |
| 2016/0050863 A1 | 2/2016 | Graber | |
| 2016/0066525 A1 | 3/2016 | Duquesnay et al. | |
| 2016/0085522 A1 | 3/2016 | Chauhan et al. | |
| 2016/0120141 A1 | 5/2016 | Stolzfus et al. | |
| 2016/0270311 A1 | 9/2016 | Martin et al. | |
| 2017/0055461 A1 | 3/2017 | Neuhoff, Jr. et al. | |
| 2017/0055473 A1 | 3/2017 | Baker | |
| 2017/0071137 A1 | 3/2017 | Mehler | |
| 2017/0105358 A1 | 4/2017 | Wilson | |
| 2017/0105372 A1 | 4/2017 | Bryan | |
| 2017/0181393 A1 | 6/2017 | Nelson | |
| 2017/0202164 A1 | 7/2017 | Dufresne | |
| 2017/0231167 A1 | 8/2017 | Storey | |
| 2017/0238486 A1 | 8/2017 | Feo et al. | |
| 2017/0332544 A1 | 11/2017 | Conrad et al. | |
| 2017/0339841 A1 | 11/2017 | Monasterio | |
| 2018/0000029 A1 | 1/2018 | Martin et al. | |
| 2018/0007849 A1 | 1/2018 | Cohen et al. | |
| 2018/0014486 A1 | 1/2018 | Creechley et al. | |
| 2018/0042186 A1 | 2/2018 | Kop | |
| 2018/0084739 A1 | 3/2018 | Bottari | |
| 2018/0092314 A1 | 4/2018 | Mcguinness et al. | |
| 2018/0168108 A1 | 6/2018 | Foreman et al. | |
| 2018/0199526 A1 | 7/2018 | Guo et al. | |
| 2018/0213734 A1 | 8/2018 | Smith et al. | |
| 2018/0295800 A1 | 10/2018 | Kiernan | |
| 2018/0310499 A1 | 11/2018 | Buuren et al. | |
| 2018/0325052 A1 | 11/2018 | Gru et al. | |
| 2018/0362265 A1* | 12/2018 | Millar ............. B65G 17/002 | |
| 2019/0082617 A1 | 3/2019 | Moffitt et al. | |
| 2019/0082627 A1 | 3/2019 | Moffitt et al. | |
| 2019/0124866 A1 | 5/2019 | Maxwell | |
| 2019/0200551 A1 | 7/2019 | Walters | |
| 2019/0269079 A1 | 9/2019 | Klein et al. | |
| 2019/0269080 A1 | 9/2019 | Whitworth et al. | |
| 2019/0269081 A1 | 9/2019 | Whitworth et al. | |
| 2019/0269083 A1 | 9/2019 | Klein et al. | |
| 2019/0297787 A1 | 10/2019 | Klein et al. | |
| 2020/0008366 A1 | 1/2020 | Klein et al. | |
| 2020/0008378 A1 | 1/2020 | Buuren et al. | |
| 2020/0037525 A1 | 2/2020 | Klein et al. | |

FOREIGN PATENT DOCUMENTS

| | | | | |
|---|---|---|---|---|
| CN | 104088380 B | 7/2016 | | |
| CN | 205567360 U | 9/2016 | | |
| CN | 206149963 U | 5/2017 | | |
| CN | 108015061 | * 12/2017 | ............ B08B 9/023 |
| CN | 106193966 B | 2/2018 | | |
| CN | 108005554 A | 5/2018 | | |
| CN | 208446303 U | 2/2019 | | |
| DE | 102016104615 A1 * | 9/2017 | ............... B08B 7/02 |
| EP | 2821149 A1 * | 1/2015 | ............... B08B 1/04 |
| JP | 4913009 B2 | 4/2012 | | |
| KR | 20120000852 | * 7/2010 | ............... A01G 9/06 |
| KR | 20160064794 A | 6/2016 | | |
| WO | 2017100377 A1 | 6/2017 | | |
| WO | 2017109279 A1 | 6/2017 | | |
| WO | 2021055001 A1 | 3/2021 | | |

OTHER PUBLICATIONS

International Search Report for PCT/US2019/035951 dated Oct. 4, 2019, 3 pgs.
International Search Report for PCT/US2019/035972 dated Oct. 4, 2019, 3 pgs.
Non-Final Office Action dated Mar. 24, 2020 in U.S. Appl. No. 16/397,142, 12 pgs.
Non-Final Office Action dated May 7, 2020 in U.S. Appl. No. 15/968,425, 14 pgs.
Notice of Allowance dated Apr. 21, 2020 in U.S. Appl. No. 16/397,142, 9 pgs.
Notice of Allowance dated May 19, 2020 in U.S. Appl. No. 15/968,425, 5 pgs.

(56) References Cited

OTHER PUBLICATIONS

Written Opinion for PCT/US2018/060120 dated Feb. 19, 2019, 11 pgs.
Written Opinion for PCT/US2018/063297 dated Feb. 20, 2019, 9 pgs.
Restriction Requirement mailed in U.S. Appl. No. 16/406,536 dated Aug. 27, 2021, 7 pgs.
Written Opinion for PCT/US2019/035951 dated Oct. 4, 2019, 5 pgs.
Written Opinion for PCT/US2019/035972 dated Oct. 4, 2019, 4 pgs.
Chinese Office Action, Application No. 201980050203.2; dated Jan. 9, 2022; 5 pages.
European Extended Examination Report, Application No. 19843228.8, dated Feb. 23, 2022, 56 pages.
Singapore Patent Application No. 11202100806X, Written Opinion, dated Sep. 5, 2022, 11 pages.
Final Office Action dated Jan. 24, 2023 in U.S. Appl. No. 16/376,878, 14 pgs.
Non-Final Office Action dated Aug. 17, 2022 in U.S. Appl. No. 16/376,878, 12 pgs.
International Search Report for PCT/US2018/060120 dated Feb. 19, 2019, 4 pages.
International Search Report for PCT/US2018/063297 dated Feb. 20, 2019, 2 pages.

* cited by examiner

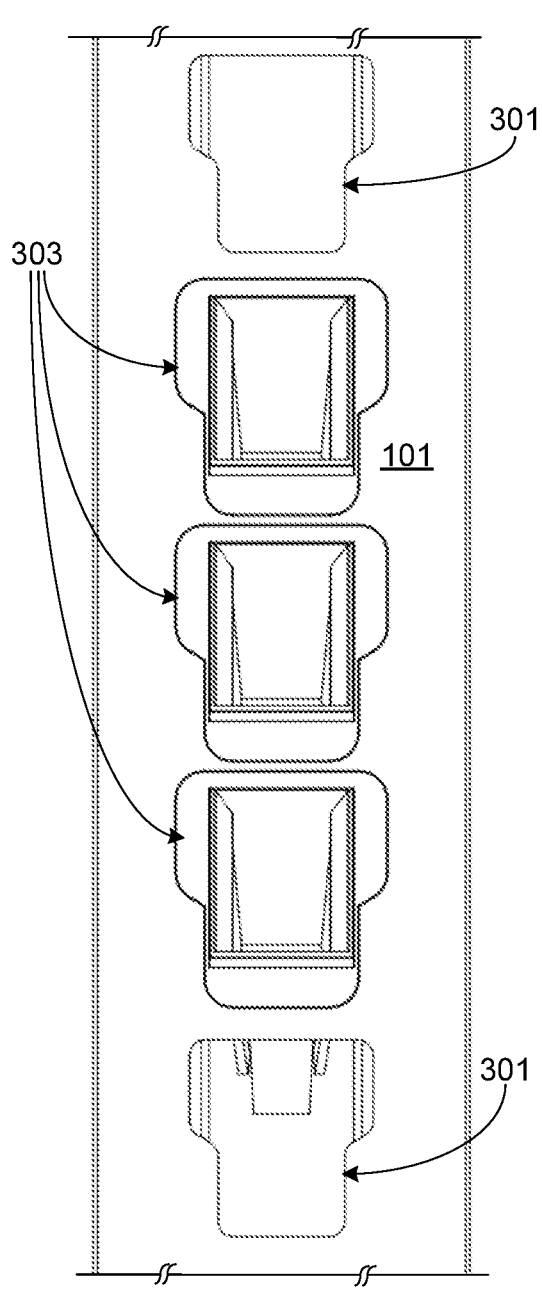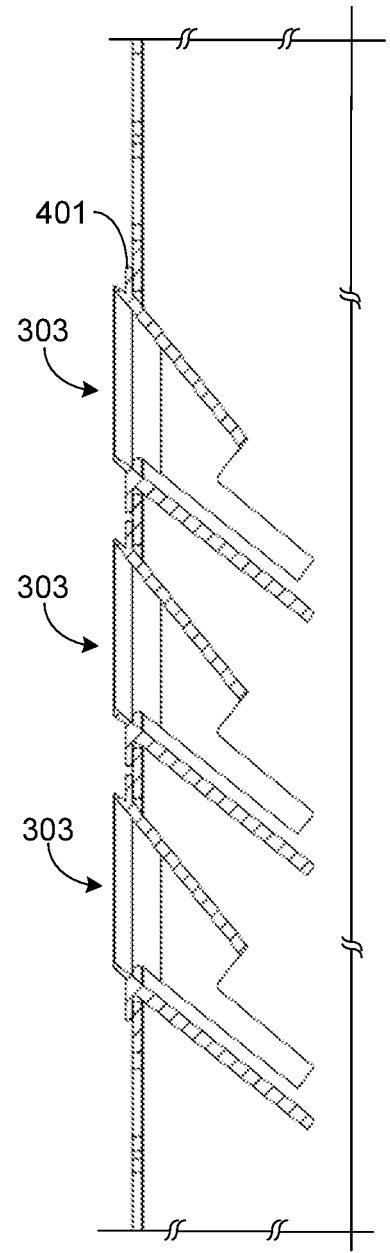
FIG. 3
FIG. 4

CLEANING APPARATUS FOR USE WITH A PLANT SUPPORT TOWER

FIELD OF THE INVENTION

The present invention relates generally to hydroponic growing systems and, more particularly, to a device and system configured to clean a multi-piece, hinged, hydroponic tower between use cycles.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides an apparatus that simplifies hydroponic tower maintenance between use cycles.

SUMMARY OF THE INVENTION

A hydroponic tower cleaning system is provided that is configured to clean a multi-piece, hinged, hydroponic tower, where the hydroponic tower is comprised of (i) a tower body that defines at least a first tower cavity, where a first edge portion of the tower body includes a first tower body hinge member; (ii) a first tower face plate, where an edge portion of the first tower face plate includes a first face plate hinge member, where the first tower face plate is hingeably coupled to the tower body via the first tower body hinge member and the first face plate hinge member, where the first tower face plate is positionable relative to the tower body in at least a first tower cavity closed position and a first tower cavity open position, and where the first tower face plate includes a first plurality of plant container cut-outs; (iii) a first fastener configured to temporarily latch the first tower face plate to the tower body when the first tower face plate is in the first tower cavity closed position; and (iv) a first plurality of plant containers attached to the first tower face plate via the first plurality of plant container cut-outs. The hydroponic tower cleaning system is comprised of (i) a drive system that propels the multi-piece hydroponic tower through the hydroponic tower cleaning system; (ii) an alignment system that aligns the multi-piece hydroponic tower body within the hydroponic tower cleaning system; (iii) a brush unit configured to brush the multi-piece hydroponic tower as it is propelled through the hydroponic tower cleaning system; and (iv) a plunger unit configured to expel growth media and plant debris from the first plurality of plant containers as the multi-piece hydroponic tower is propelled through the hydroponic tower cleaning system. The hydroponic tower cleaning system may further include an air blower configured to direct a jet of air towards the multi-piece hydroponic tower after the multi-piece hydroponic tower has passed the brush unit and the plunger unit and as it is propelled through the hydroponic tower cleaning system.

In one aspect of the invention, the brush unit may include a first rotating brush that is configured to brush a plurality of plant container surfaces adjacent to an inside surface of the first tower face of each of the first plurality of plant containers. The brush unit may further include a second rotating brush that is configured to brush an outside surface of the first tower face.

In another aspect, the plunger unit may include a plunger that is configured to controllably alternate between a withdrawn position and an extended position. In the withdrawn position the plunger allows passage of the multi-piece hydroponic tower and the first plurality of plant containers. In the extended position the plunger extends at least partially into each plant container of the first plurality of plant containers as the multi-piece hydroponic tower is propelled through the hydroponic tower cleaning system. The plunger unit may further include a plant container position sensor that is configured to monitor the position of each of the plant containers relative to the plunger unit and to activate the plunger unit (i.e., extend the plunger) as each plant container is aligned with the plunger unit. Preferably the plunger is pneumatically driven.

In another aspect, the cleaning system may further include a plurality of idler rollers comprised of at least one upper idler roller configured to limit upward motion of the first tower face plate as the multi-piece hydroponic tower is propelled through the hydroponic tower cleaning system, and of at least one lower idler roller configured to limit downward motion of the first tower face plate as the multi-piece hydroponic tower is propelled through the hydroponic tower cleaning system. The at least one upper idler roller may include a first upper idler roller located before the brush unit, a second upper idler roller located after the brush unit and before the plunger unit, and a third upper idler roller located after the plunger unit. The at least one lower idler roller may include a first lower idler roller located before the brush unit, a second lower idler roller located after the brush unit and before the plunger unit, and a third lower idler roller located after the plunger unit.

In another aspect, the cleaning system may further include at least one set of tower body alignment rollers comprised of a first tower body alignment roller and a second tower body alignment roller, where the first tower body alignment roller is located on a first side of the tower body and configured to locate and align the first side of the tower body, and where the second tower body alignment roller is located on a second side of the tower body and configured to locate and align the second side of the tower.

In another aspect, the drive system may include at least one drive roller coupled to a drive motor and configured to contact the tower body along at least a first tower body side. Operation of the drive motor forces rotation of the at least one drive roller, thereby propelling the multi-piece hydroponic tower through the hydroponic tower cleaning system. The drive system may further include at least one secondary drive roller, which is not coupled to the drive motor, and which is configured to contact the tower body along at least a second tower body side.

In another aspect, the multi-piece hydroponic tower may include (i) a first modified V-shaped groove running along the length of the first side of the tower body, the first modified V-shaped groove comprising a first inner groove wall, a first sloped groove wall that couples the first edge of the first inner groove wall to the first edge of the first side of the tower body, and a second sloped groove wall that couples the second edge of the first inner groove wall to the second edge of the first side of the tower body; and (ii) a second modified V-shaped groove running along the length of the second side of the tower body, the second modified V-shaped groove comprising a second inner groove wall, a third sloped groove wall that couples the first edge of the second inner groove wall to the first edge of the second side of the tower body, and a fourth sloped groove wall that couples the second edge of the second inner groove wall to the second edge of the second side of the tower body. The first inner groove wall may be substantially parallel to the first side of the tower body and substantially perpendicular to the first tower cavity rear wall, and the second inner groove wall may be substantially parallel to the second side of the tower body and substantially perpendicular to the first tower cavity rear wall. The drive system may include a plurality of drive rollers including at least a first drive roller and a second drive roller, where the first drive roller is coupled to a drive motor and configured to contact the tower body within the first modified V-shaped groove. Operation of the drive motor forces rotation of the first drive roller, thereby propelling the multi-piece hydroponic tower through the hydroponic tower cleaning system. The second drive roller is not coupled to the drive motor and is configured to contact the tower body within the second modified V-shaped groove. The second drive roller may be mounted via a pneumatic or spring coupler and configured to apply pressure to the tower body via the second inner groove wall.

In another aspect, the multi-piece hydroponic tower may be a dual-sided hydroponic tower with the tower body defining first and second tower cavities. In this configuration the first body hinge member of the first edge portion of the tower body corresponds to the first tower cavity. A second tower body hinge member of a second edge portion of the tower body corresponds to the second tower cavity. The dual-sided hydroponic tower further comprises (i) a second tower face plate, where an edge portion of the second tower face plate includes a second face plate hinge member, where the second tower face plate is hingeably coupled to the tower body via the second tower body hinge member and the second face plate hinge member, where the second tower face plate is positionable relative to the tower body in at least a second tower cavity closed position and a second tower cavity open position, and where the second tower face plate includes a second plurality of plant container; (ii) a second fastener configured to temporarily latch the second tower face plate to the tower body when the second tower face plate is in the second tower cavity closed position; and (iii) a second plurality of plant containers attached to the second tower face plate via the second plurality of plant container cut-outs. The brush unit in this dual-sided configuration includes a first rotating brush configured to brush a first plurality of plant container surfaces of each of the first plurality of plant containers and a second rotating brush configured to brush a second plurality of plant container surfaces of each of the second plurality of plant containers. The plunger unit in this dual-sided configuration is configured to expel growth media and plant debris from both the first and second pluralities of plant containers as the multi-piece hydroponic tower is propelled through the hydroponic tower cleaning system. In this dual-sided configuration, preferably the first modified V-shaped groove is centered between the first tower cavity and the second tower cavity, and the second modified V-shaped groove is centered between the first tower cavity and the second tower cavity. The first inner groove wall may be substantially parallel to the first side of the tower body and substantially perpendicular to the first tower cavity rear wall, and the second inner groove wall may be substantially parallel to the second side of the tower body and substantially perpendicular to the second tower cavity rear wall.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. The same reference label on different figures should be understood to refer to the same component or a component of similar functionality. Additionally, multiple labels using the same numerical label and differing only in the letter label (e.g., 1411A and 1411B) refer to components of the same or similar functionality but located in different locations within the device (e.g., left and right configured components that are of the same general design and perform the same general function).

FIG. 3 provides a front planar view of a portion of a hydroponic tower containing several plant plug holders;

FIG. 4 provides a side cross-sectional view of the tower assembly shown in FIG. 3;

DESCRIPTION OF THE SPECIFIC EMBODIMENTS

Figure 1:
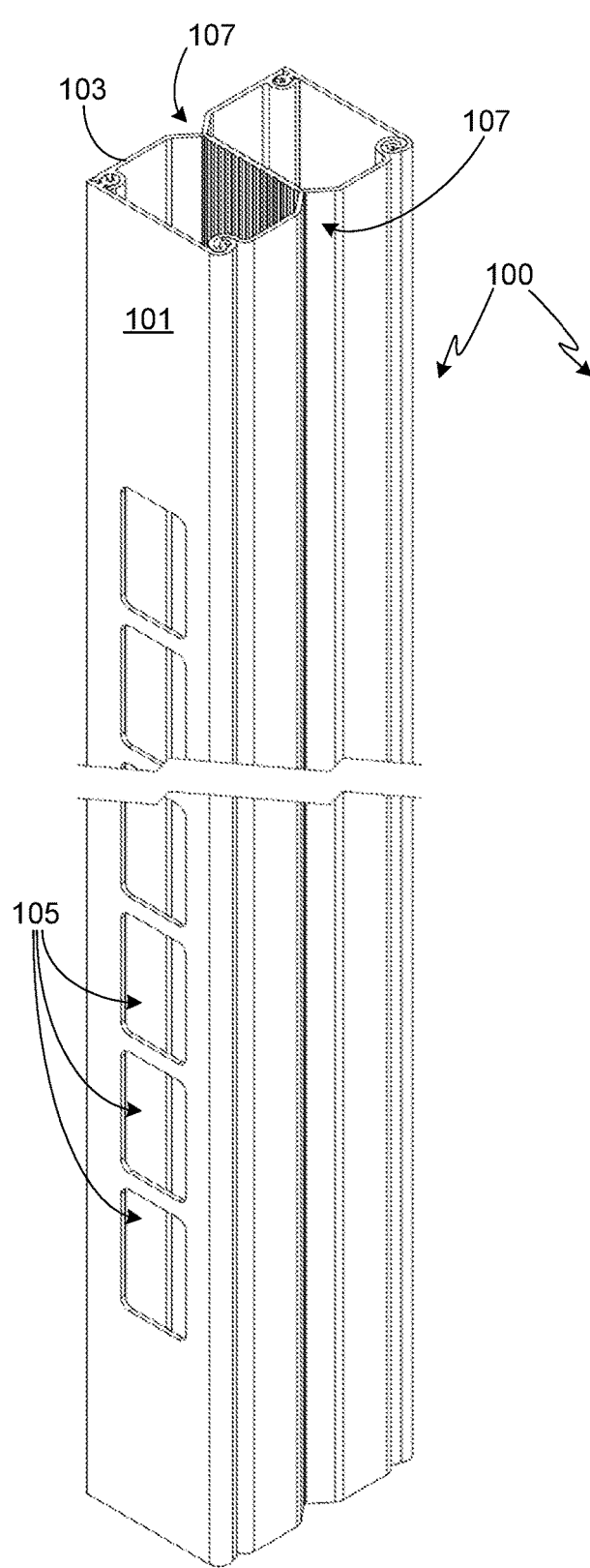
FIG. 1 provides a perspective view of an exemplary dual-sided, multi-piece hydroponic tower with hingeably coupled front face plates, this view showing the face plates in the closed position.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In accordance with the invention, an apparatus is disclosed that provides a means for automatically cleaning and removing plant and material debris from within a hinged, hydroponic tower, and more particularly, from within the plant containers contained within such a hydroponic tower. As plant and material debris is often difficult to remove, it is important to utilize a debris removal process, such as that described herein, prior to washing the tower, thereby ensuring that the hydroponic tower and plant containers are completely clean before initiating the tower re-planting step.

As described in detail below, the tower cleaning and debris removal apparatus of the invention is comprised of several primary components: (i) a drive system that forces the tower through the apparatus; (ii) an alignment system that ensures that the tower remains in proper alignment throughout the cleaning process; (iii) a brush system that initiates separation of plant debris from the tower/plant containers and ensures that the plant roots are torn apart; (iv) a plunger system to eject plant debris from within the plant containers; (v) an air delivery system to blow away the debris; and (vi) rollers to maintain tower face alignment during the cleaning process. Preferably the apparatus also includes means for containing the debris that is removed from the tower.

The hydroponic tower cleaning and debris removal apparatus of the invention can be configured to work with a variety of tower designs. In order to clarify operation of the disclosed system, the invention is illustrated using the dual-sided, multi-piece hydroponic tower described in co-pending and co-assigned U.S. patent application Ser. No. 15/968,425, filed 1 May 2018, the disclosure of which is incorporated herein for any and all purposes. It should be understood, however, that the present invention may also be configured for use with a single-sided, multi-piece hydroponic tower such as that disclosed in U.S. patent application Ser. No. 15/968,425, as well as other hydronic tower designs, and therefore the description and illustrated embodiments contained herein should not be viewed as limiting the disclosed cleaning apparatus to a particular hydroponic tower.

Figure 2:
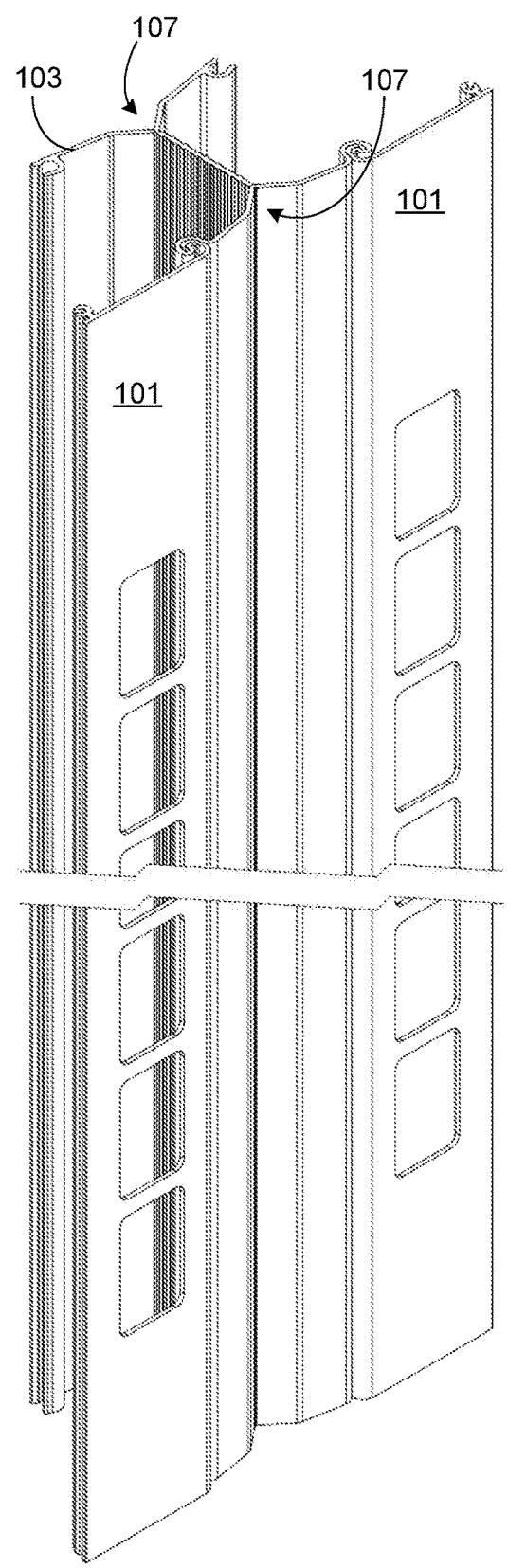
FIG. 2 provides a perspective view of the dual-sided, multi-piece hydroponic tower shown in FIG. 1, this view showing the face plates in the open position.

FIGS. 1 and 2 provide perspective views of an exemplary dual-sided, multi-piece hydroponic tower 100 in which each front face plate 101 is hingeably coupled to the tower body 103, this configuration being described in detail in U.S. patent application Ser. No. 15/968,425. In FIG. 1 each front face plate 101 is in the closed position while in FIG. 2 face plates 101 are shown in the open position. Although any of a variety of materials can be used in the manufacture of the tower, preferably the tower is fabricated from plastic (e.g., polyethylene, polypropylene, polyvinyl chloride (PVC), polytetrafluoroethylene, acrylonitrile butadiene styrene (ABS), etc.). In at least one embodiment, the tower body is fabricated from a PVC plastic and the tower face plates are fabricated from an ABS plastic. Preferably the materials used to fabricate the tower are opaque in order to prevent light from entering the tower, thus helping to minimize algae growth. Additionally, in at least one configuration the tower materials are white, thereby increasing the amount of light reflected back onto the plants.

In FIGS. 1 and 2, tower 100 includes a plurality of cut-outs 105. Each cut-out 105 is shaped and sized to accommodate the intended plant plug holder, also referred to herein as a plant container (not shown in FIGS. 1 and 2). A variety of designs and configurations may be used for the individual plant plug holders. Exemplary plant plug holders are described in detail in co-assigned and co-pending U.S. patent application Ser. No. 15/910,445, filed 2 Mar. 2018, and U.S. patent application Ser. No. 15/910,796, filed 2 Mar. 2018, the disclosures of which are incorporated herein for any and all purposes. It should be understood, however, that the tower cleaning apparatus disclosed in the present application is not limited to use with a particular plant plug holder, although clearly the location and engagement angles of the various cleaning devices (e.g., brushes, plungers and blowers) has to be configured to match the intended plant plug holders.

Figure 5:
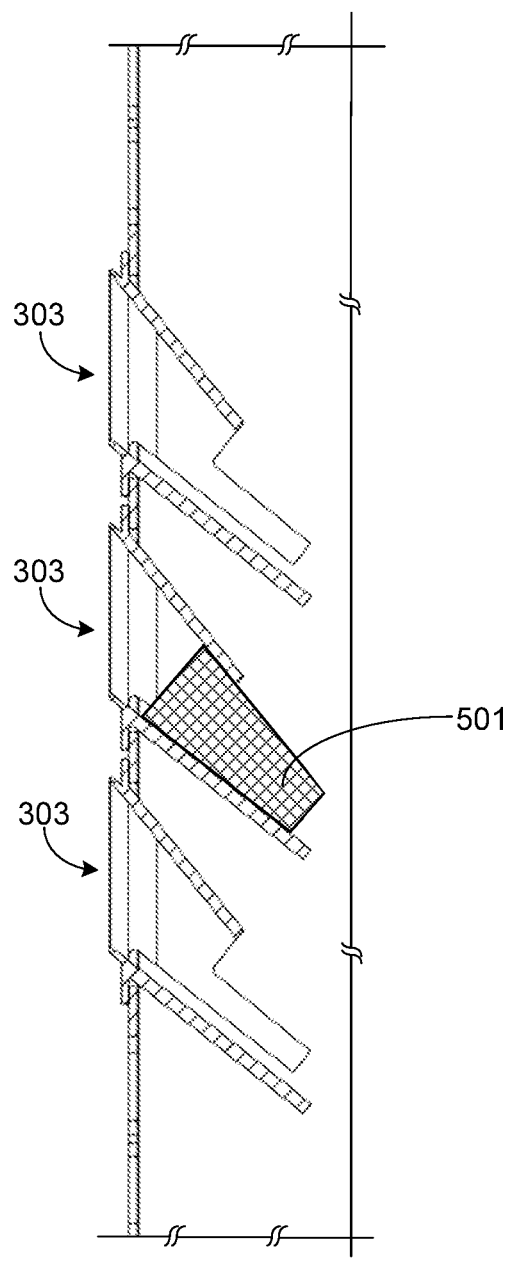
FIG. 5 provides the same view as that shown in FIG. 4, with the inclusion of a plant plug within one of the plant plug holders.

FIG. 3 provides a front planar view of a portion of a hydroponic tower assembly utilizing an alternate cut-out design 301. In this figure plant plug holders 303, such as those employed in the exemplary configuration illustrated in the present application, are shown inserted within the three middle cut-outs 301 while the uppermost and lowermost cut-outs 301 are shown open. FIG. 4 provides a vertical cross-sectional view of the portion of the tower assembly shown in FIG. 3. FIG. 5 provides the same cross-sectional view as that shown in FIG. 4, with the addition of a plant plug 501 within the middle plant plug holder 303. Note that in FIG. 5 only the plant plug is shown, i.e., there is no seedling, mature plant or root structure contained within plug 501. Additionally, note that FIGS. 4 and 5 only illustrate one side of a dual-sided hydroponic tower such as the tower shown in FIGS. 1 and 2.

The plant plug holders used with the invention are preferably fabricated from plastic (e.g., polyethylene, polypropylene, polyvinyl chloride (PVC), polytetrafluoroethylene, acrylonitrile butadiene styrene (ABS), etc.), for example using injection molding. As with the tower face plates, preferably the plant plug holders are manufactured using an opaque plastic (e.g., ABS) that is colored white to minimize algae growth within the tower and increase reflected light.

Typically the plant plug holders, e.g., holders 303, are attached to tower face 101 via edge member 401, where edge member 401 encircles the plant container opening as shown. Edge member 401 extends out and away from the sides of the plug holder, thereby allowing the back surface of the edge member to be sealed to the tower face. While the plug holder does not have to be sealed to the tower face, sealing is preferred in order to inhibit leaking between the two components. Preferably the seal completely circumscribes the plant container opening. Although a variety of techniques can be used to seal the two components together, preferably they are either bonded together (e.g., solvent bonding) or welded together (e.g., ultrasonic welding).

In tower 100, a large "V" shaped groove 107 runs along the length of the tower, and on either side of the tower as shown in FIGS. 1 and 2. Preferably groove 107 is centered on the side of tower, evenly splitting the two tower cavities. If the present invention is used with a single-sided tower, preferably the tower still includes a groove, thereby providing a simplified means for tower alignment. While the invention can be used with a tower that utilizes a V-shaped groove, preferably a modified groove shape is employed as illustrated in FIGS. 6 and 7.

Figures 6, 7:
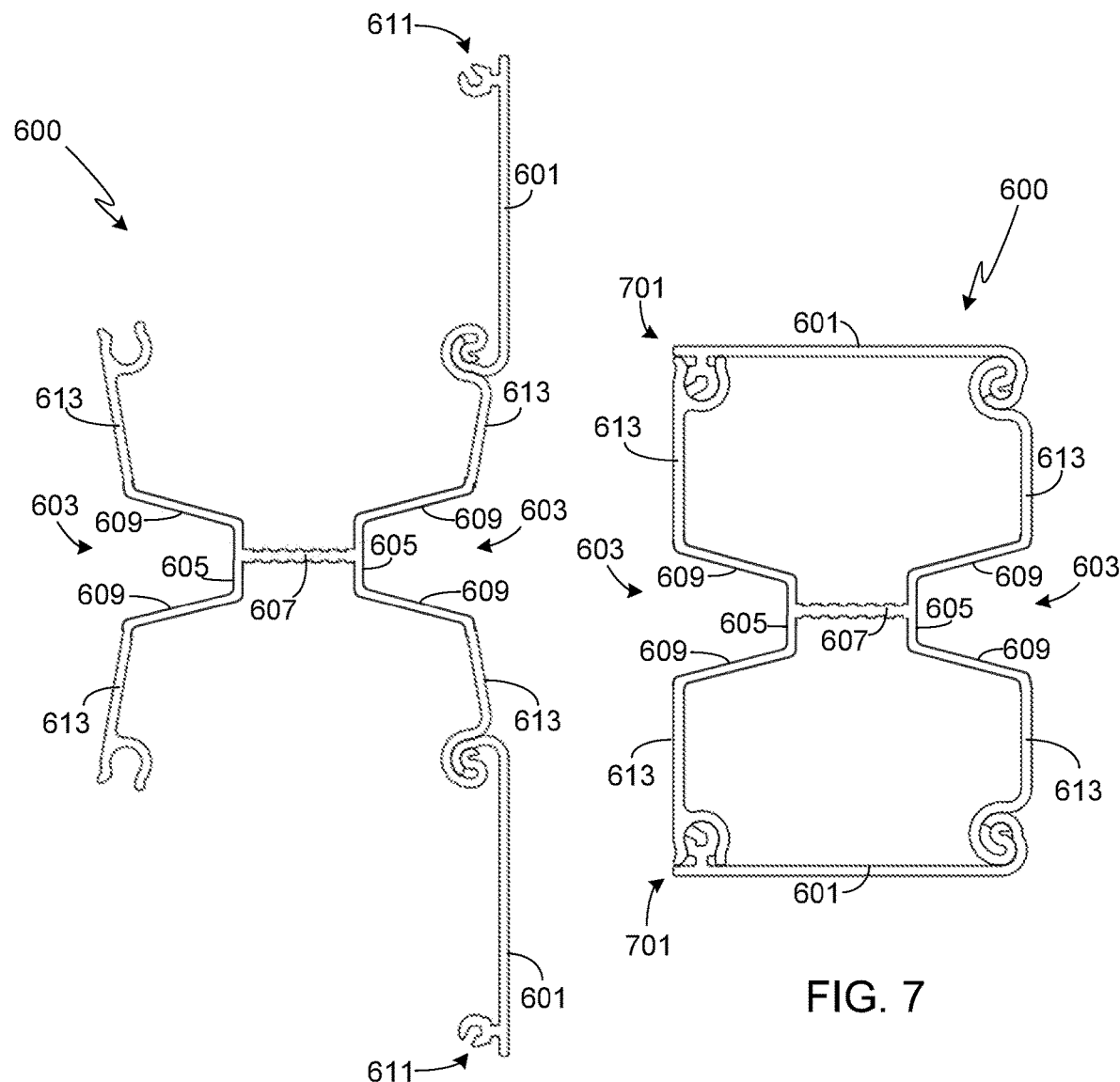
FIG. 6 provides a cross-sectional view of a preferred configuration for a multi-piece tower assembly for use with the invention, this view showing both face plates in the open position.
FIG. 7 provides a cross-sectional view of the preferred configuration for the multi-piece tower assembly shown in FIG. 6, this view showing both face plates in the closed position.

FIGS. 6 and 7 provide cross-sectional views of a preferred multi-piece, hinged tower 600. For clarity, plant plug holders are not shown affixed to the tower in these figures. In FIG. 6 face plates 601 are shown in an open position while in FIG. 7 the face plates are shown in a closed position. Preferably both the body portion and the face plates are extruded, and features such as the plant container cut-outs are punched during the process. As shown, the cross-section of tower 600 is slightly different from that of tower 100. Specifically, rather than a simple "V" shaped groove, modified groove 603 includes an inner groove wall 605 which, due to rear tower cavity wall 607, exhibits improved rigidity in this region of the groove. Sloped groove walls 609 of modified groove 603 retain a V-shape as in the previously described and illustrated tower grooves. The hinged tower faces 601 are substantially the same, if not identical, to the tower faces 101 of tower 100 and operate in the same manner as those described in U.S. patent application Ser. No. 15/968,425. In the preferred embodiment, each face plate is attached to the body of the hydroponic tower using snap-fit fasteners 701.

Figure 8:
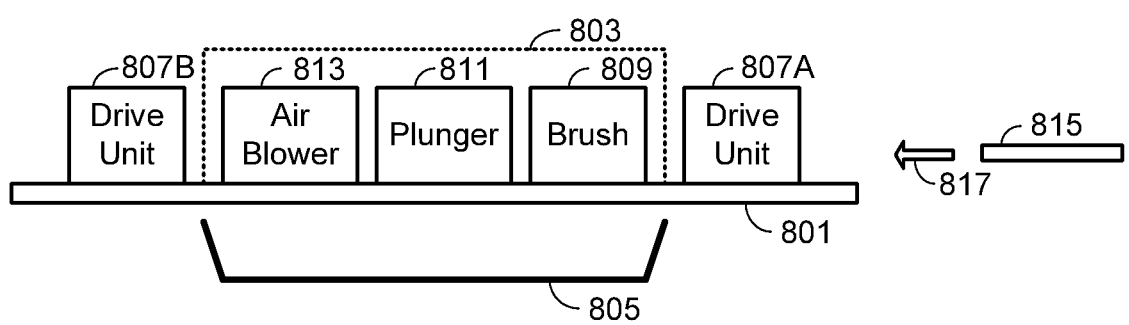
FIG. 8 provides a diagram of the basic operational units of the opening apparatus in accordance with a preferred embodiment of the invention.

FIG. 8 provides a diagram of the basic operational units of the cleaning apparatus in accordance with a preferred embodiment of the invention. Preferably the cleaning apparatus is washdown safe (i.e., built to IP65 or higher standards) in order to simplify cleaning and maintenance. In at least one embodiment, the operational units are attached to a mounting base 801, thus providing stability and rigidity to the overall structure and ensuring that the various components of the system remain aligned. To contain the plant material and other debris ejected from the tower during cleaning, preferably the apparatus, or at least those portions of the apparatus that actively clean the tower (e.g., brushes, plungers and air blowers), are housed within a hood 803. Additionally the system preferably includes a debris collector 805 into which the debris ejected from the tower during cleaning is caught, thereby simplifying debris disposal while maintaining the cleanliness of the work station.

The system described herein utilizes a drive unit to propel the hydroponic tower through the cleaning apparatus. The drive unit can be located before the cleaning system and used to push the tower through the cleaner. Alternately, the drive unit can be located after the cleaning system and used to pull the tower through the cleaner. In the preferred configuration, however, a pair of drive units 807A and 807B is used to both push and pull the tower, respectively, through the cleaning system. In addition to propelling the tower through the cleaning system, the drive unit(s) also aids in ensuring proper alignment of the tower relative to the cleaning system. The cleaning system includes a brush unit 809, a plunger unit 811 and an air blower 813. Note that in the illustrated embodiment, a tower assembly 815 enters the cleaning system from the right and passes through the system in a direction 817.

Figure 9:
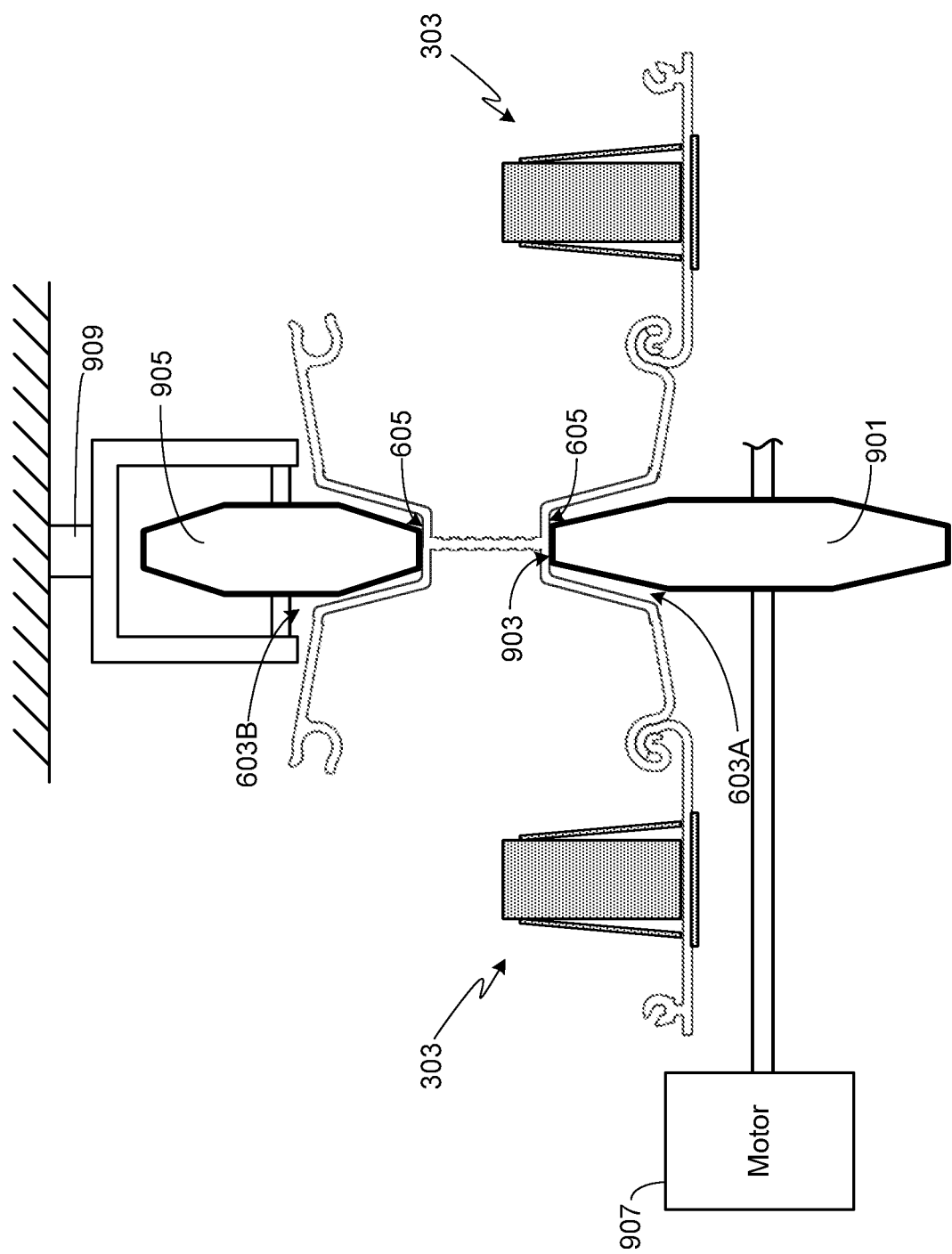
FIG. 9 illustrates the drive unit of the tower opening system of the invention, this figure providing a simplified cross-sectional view of the multi-piece tower assembly shown in FIG. 7 along with a pair of drive rollers.

In the preferred embodiment of the invention, drive rollers are pressed against the face of wall 605 of the modified V-shaped groove that runs the length of the tower body. FIG. 9 provides a preferred configuration for a drive system, this figure showing the dual-sided tower with the modified V-shaped groove 603 shown in FIGS. 6 and 7 with plant containers 303 in place. As illustrated, a drive roller 901 fits within one of the tower's grooves 603 such that the face 903 of drive roller 901 presses against wall 605 of groove 603A. Preferably face 903 of drive roller 901 is substantially flat, thereby providing greater contact area with wall 605 of the groove. A second drive roller 905 presses against wall 605 of groove 603B, where grooves 603A and 603B are complimentary modified V-shaped grooves located on either side of the tower body. One of the drive rollers (e.g., drive roller 901) is coupled to a drive motor 907 while the second drive roller (e.g., drive roller 905) is preferably not driven and is used to apply pressure against the tower, thus ensuring that the drive wheel coupled to the motor remains in contact with wall 605 of the groove and that rotation of the motorized drive wheel forces forward movement of the tower through the tower opening apparatus. The second drive roller is preferably coupled to a tensioner 909 (e.g., pneumatic or spring coupler) in order to ensure that sufficient force is applied by the second drive roller, thereby forcing the tower against the motorized drive roller. The motorized drive roller, and in some embodiments both drive rollers, is fabricated from a material with a relatively high coefficient of friction. Typically a polyurethane material is used for the motorized drive roller, and in some cases for both drive rollers, with a kinetic coefficient of friction that is preferably greater than 1. In some applications a material with a high coefficient of friction (e.g., polyurethane, rubber, etc.) is applied to the outer layer of the drive roller(s).

Figure 10:
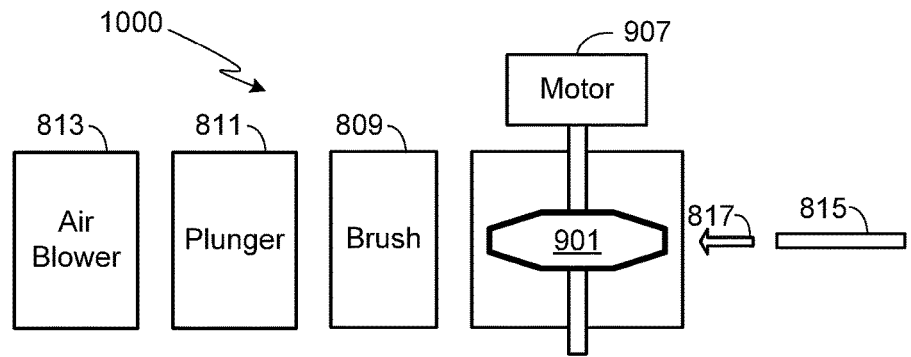
FIG. 10 provides a simplified top-down view of a first configuration for the drive system of the invention.
Figure 11:
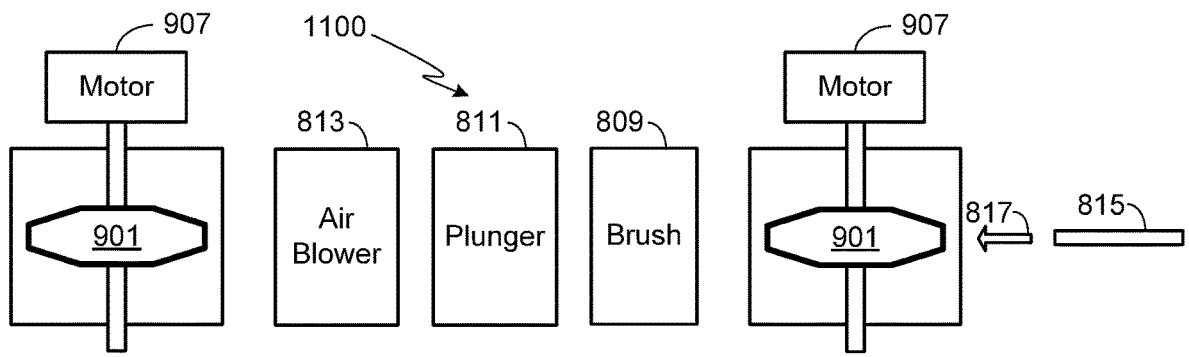
FIG. 11 provides a simplified top-down view of a second configuration for the drive system of the invention.
Figure 12:
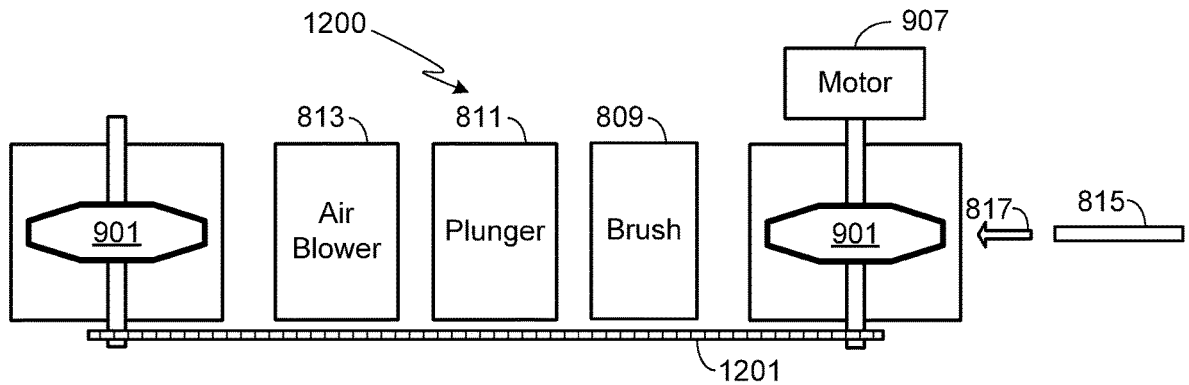
FIG. 12 provides a simplified top-down view of a third configuration for the drive system of the invention.

As previously noted, while utilizing the basic operational units of the tower cleaning system, the present invention can be modified to accommodate various tower configurations, thus allowing the system to be used with hydroponic towers of different dimensions, different alignment groove configurations, various hinge mechanisms and both dual and single-sided towers. FIGS. 10-12 provide simplified top-down views of three different configurations for the drive unit of the invention, each using drive rollers as described above and illustrated in FIG. 9. Exemplary configuration 1000 uses a single drive unit located at the entrance to the cleaning apparatus. Exemplary configurations 1100 and 1200 utilize dual drive units, one located at the entrance to the cleaning apparatus and one located at the apparatus exit. In configuration 1100, each drive unit is coupled to its own motor 907. In configuration 1200, a single motor is coupled to both drive units, one directly and one indirectly via a belt drive 1201. Preferably belt drive 1201 utilizes a metal chain belt, an elastomer v- or multi-ribbed belt, or a polyurethane v- or multi-ribbed-belt.

Figure 13:
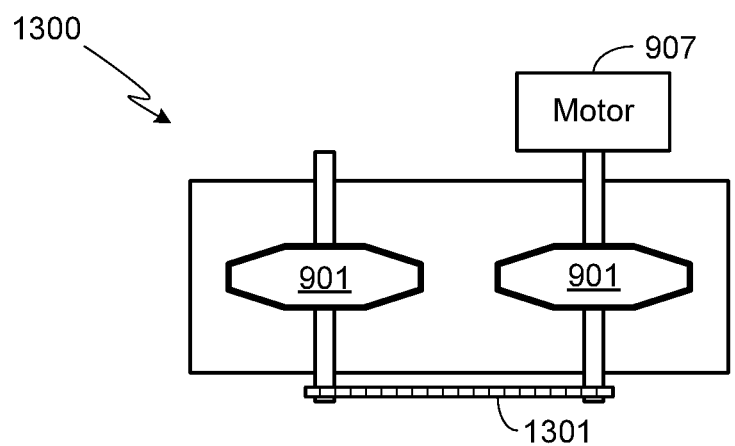
FIG. 13 provides a simplified top-down view of a drive unit utilizing two drive rollers.
Figure 14:
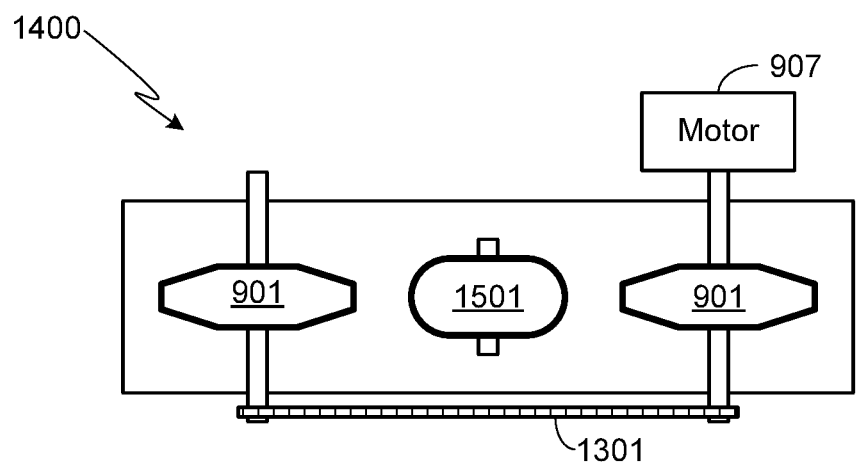
FIG. 14 provides a simplified top-down view of a drive unit utilizing two drive rollers as well as an alignment roller.

Regardless of whether the system of the invention utilizes a drive unit before the cleaning system, after the cleaning system, or both before and after the cleaning system, it should be understood that each drive unit(s) can utilize a single drive roller or multiple drive rollers. For example, FIG. 13 illustrates a drive unit 1300 that utilizes a pair of drive rollers 901, this unit being capable of working before, after, or both before and after the cleaning system. Similarly, FIG. 14 illustrates a drive unit 1400 that utilizes a pair of drive rollers 901 as well as an alignment roller 1501, the alignment roller being described in detail below. Preferably belt drive 1301 utilizes a metal chain belt, an elastomer v- or multi-ribbed belt, or a polyurethane v- or multi-ribbed-belt.

As previously noted, in addition to drive rollers the operating apparatus of the invention preferably utilizes one or more alignment rollers that ensure that the tower remains correctly aligned as it passes through the cleaning apparatus. Preferably the alignment rollers are positioned in pairs, where each pair includes an alignment roller located on one side of the tower (e.g., above the tower) and a complimentary alignment roller located on the opposing tower side (e.g., below the tower). Utilizing complementary roller pairs enhances tower stability and alignment within the cleaning apparatus. In the preferred embodiment, a first pair of complimentary alignment rollers immediately precedes the cleaning apparatus, specifically the brush unit, and a second pair of complimentary alignment rollers immediately follows the cleaning apparatus, specifically the air blower unit.

Figure 15:
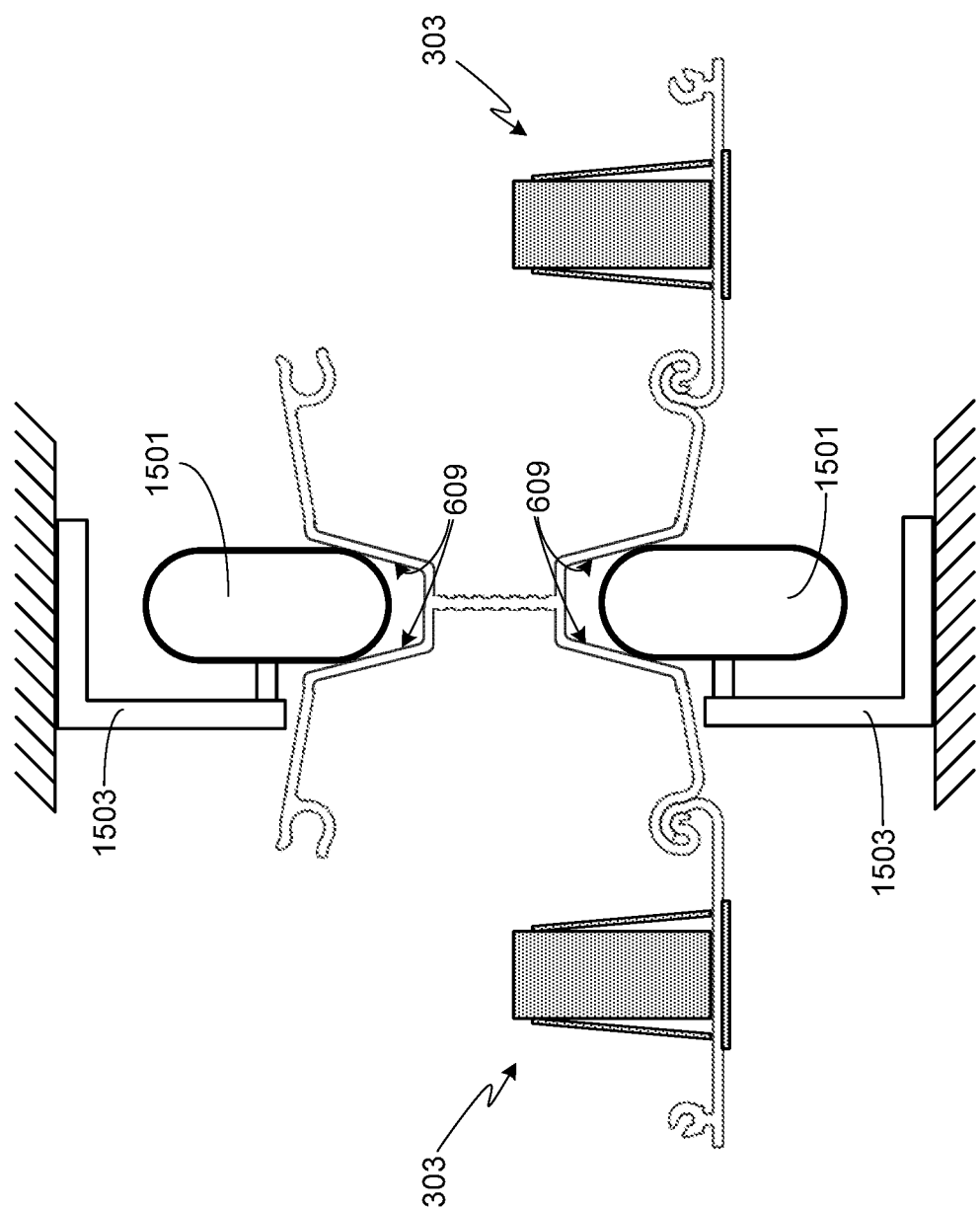
FIG. 15 illustrates a pair of alignment rollers relative to the multi-piece tower assembly shown in FIG. 9, this figure providing a simplified cross-sectional view of the assembly.

In the preferred embodiment, and as illustrated in the cross-sectional view provided by FIG. 15, the alignment rollers 1501 fit within the modified V-shaped grooves that run the length and on either side of the tower. Preferably the alignment rollers 1501 have a more rounded profile than the drive rollers, thereby contacting the sloped side walls 609 of the groove rather than groove face 605. Although the alignment rollers 1501 may be coupled to pneumatic or spring couplers in order to force contact between the roller surfaces and the tower grooves, the inventors have found that active roller mountings are not required and that the alignment rollers can be mounted using static mounts 1503 as shown. In general, the alignment rollers are mounted on axles which are supported by pillow blocks. The axles can also be supported by shaft mounts, or the wheels can be supported by shoulder bolts in a plate or similar mount. As rollers 1501 only perform the function of tower alignment, not tower motion, the inventors have found that the material used to fabricate the rollers is not critical. Preferably a plastic material, for example a thermoplastic such as Delrin®, is used to fabricate the alignment rollers.

Figure 16:
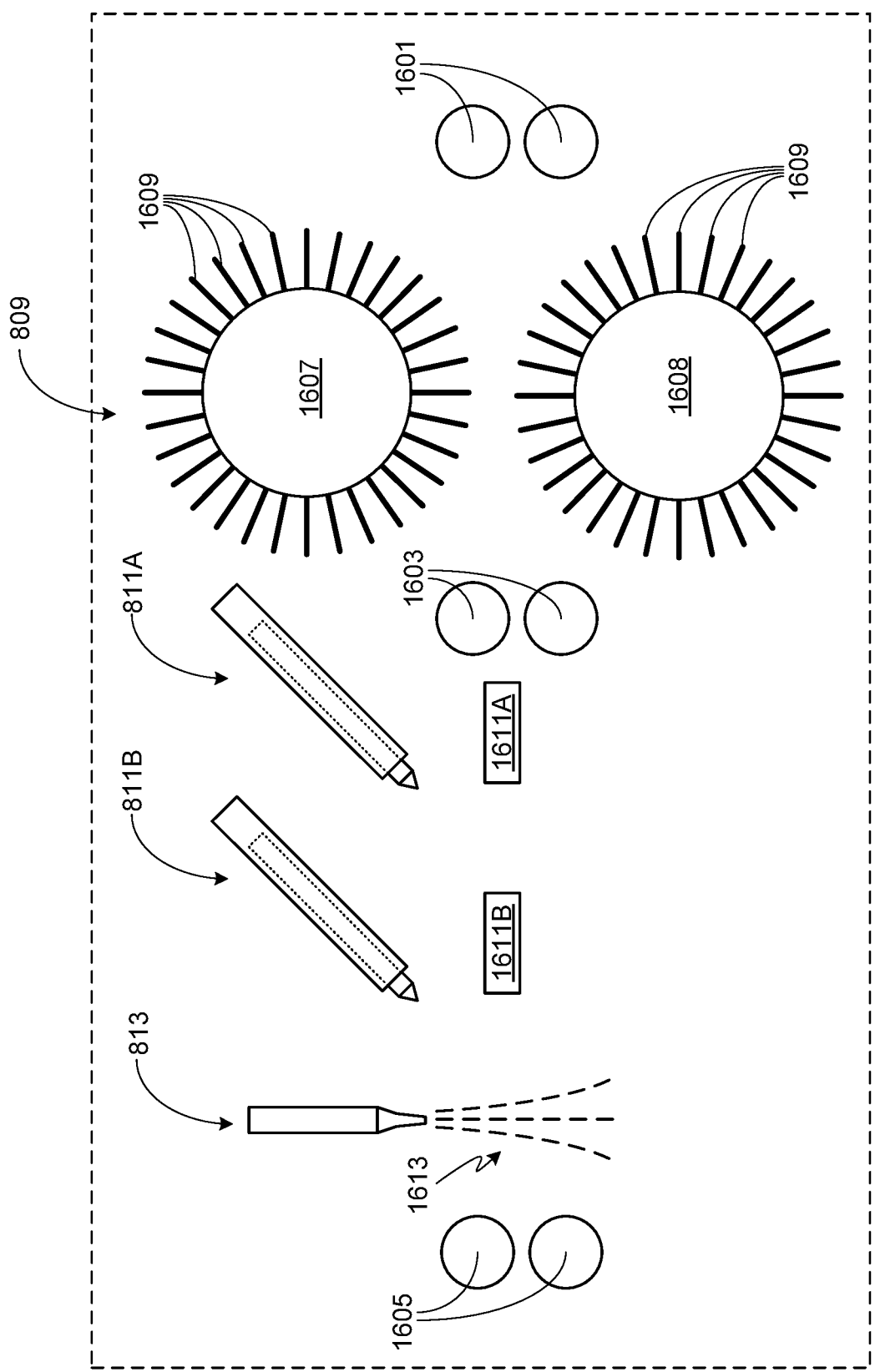
FIG. 16 provides a simplified side view of the cleaning apparatus in accordance with a preferred embodiment of the invention.

FIG. 16 provides a simplified side view of the primary components comprising the tower cleaning system of the invention. As the preferred embodiment of the invention is configured to clean a dual-sided hydroponic tower as described above, it should be understood that there is a second set of cleaning components (e.g., brush, plunger and air blower components) behind those shown in FIG. 16 that are used on the adjacent, second side of the tower.

Figure 17:
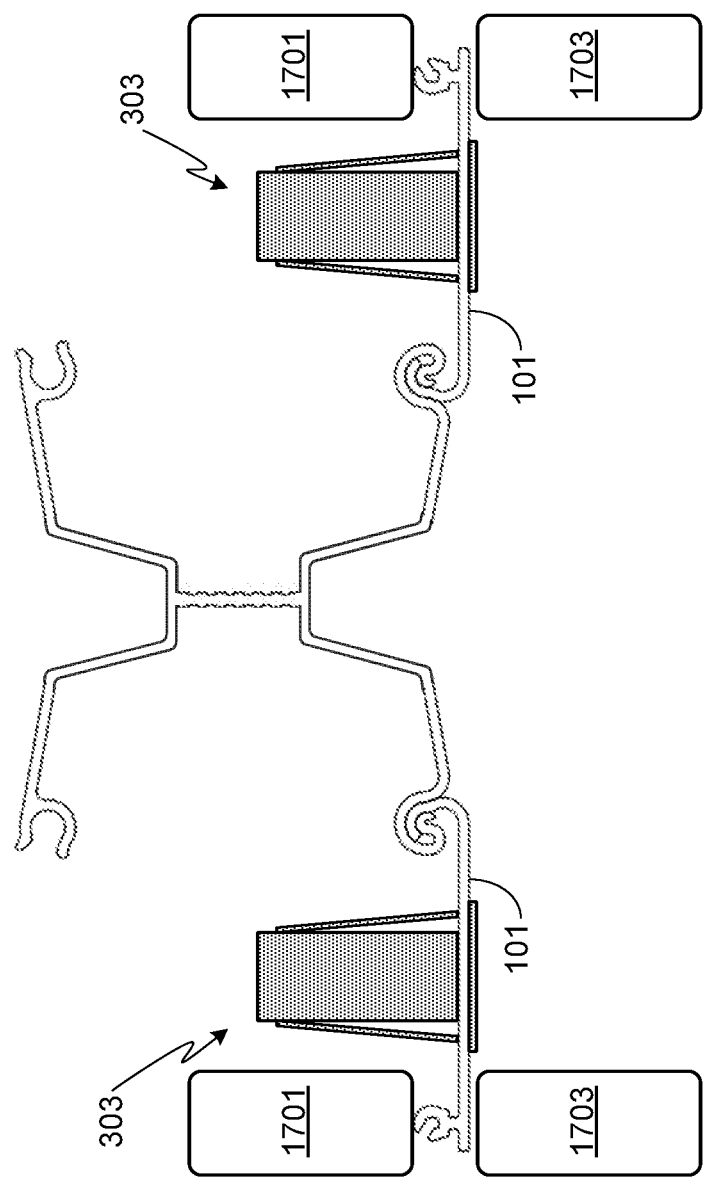
FIG. 17 provides a simplified end view of the assembly that illustrates the use of constraining rollers to maintain tower face plate and plant container position in the multi-piece tower assembly shown in FIGS. 9 and 13, this view not including alignment rollers, drive rollers or any of the cleaning system components.

The inventors have found that the cleaning process used and described herein can occasionally cause tower movement, in particular tower face movement. Since tower face movement can cause the attached plant containers to become misaligned with the cleaning system, the preferred embodiment of the invention utilizes several pairs of idler rollers, also referred to herein as constraining rollers. Preferably, and as shown in FIG. 16, a first pair of idler rollers 1601 is positioned immediately prior to the brushes, a second pair of idler rollers 1603 is positioned immediately after the brushes and immediately before the plunger, and a third pair of idler rollers 1605 is positioned after the air blowers and before the tower assembly leaves the cleaning system. As shown in FIG. 17, an upper idler roller 1701 ensures that the tower face plate 101 does not move in an upward direction while lower idler roller 1703 ensures that the tower face plate 101 does not move in a downward direction. In general if the tower face moves upward by more than a minimal amount, the cleaning system may not operate as intended. For example, the brushes may not interact with the tower face/plant container correctly. In some cases tower face misalignment may even cause the plunger to damage the tower face/plant container. Tower face movement in a downward direction by more than a minimal amount may not only cause misalignment between the tower face/plant container and the cleaning system, but may also lead to tower hinge damage.

Figure 18:
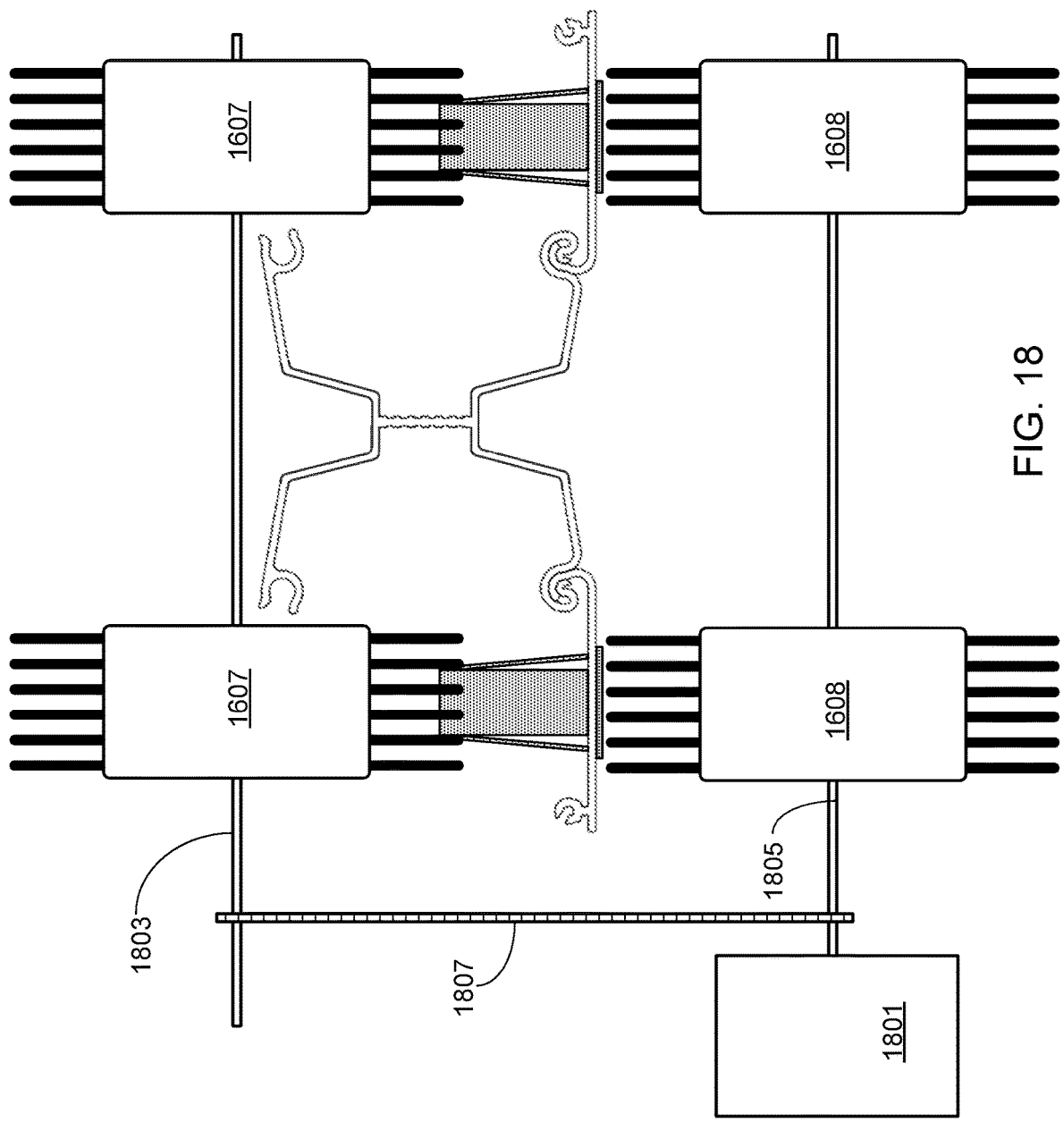
FIG. 18 provides a simplified end view of the assembly that illustrates the rotating brushes of the cleaning system.

The first cleaning component of the tower cleaning system is the brush unit 809. In the preferred embodiment, each tower face is cleaned by an upper rotating brush 1607 and a lower rotating brush 1608. In an alternate embodiment, only the upper rotating brush 1607 is used in this section of the cleaning system. Each rotating brush includes a plurality of coarse bristles 1609, the bristles preferably fabricated from plastic. As the tower passes through the cleaning system, the rotating brush(es) break-up the roots sticking out from the plant plug, thereby simplifying plug removal with the plunger. FIG. 18 provides a simplified end view of the cleaning system, this view illustrating placement of the rotating brushes. Preferably both brushes, assuming the use of dual rotating brushes as preferred and illustrated, utilize a single drive motor 1801 where the brushes on axle 1803 are coupled to the brushes on axle 1805 via a belt 1807.

The second cleaning component of the tower cleaning system is the plunger unit 811. As shown in FIG. 16, the preferred embodiment includes a pair of plungers 811A and 811B for each side of the tower. Although an alternate embodiment of the invention uses a single plunger unit, the preferred embodiment utilizes a pair of plungers in order to provide redundancy and ensure that the plant material within each plant container 303 is removed. Preferably the plungers are pneumatically driven, although the plungers can also utilize hydraulic or electric servo drivers.

Figure 19:
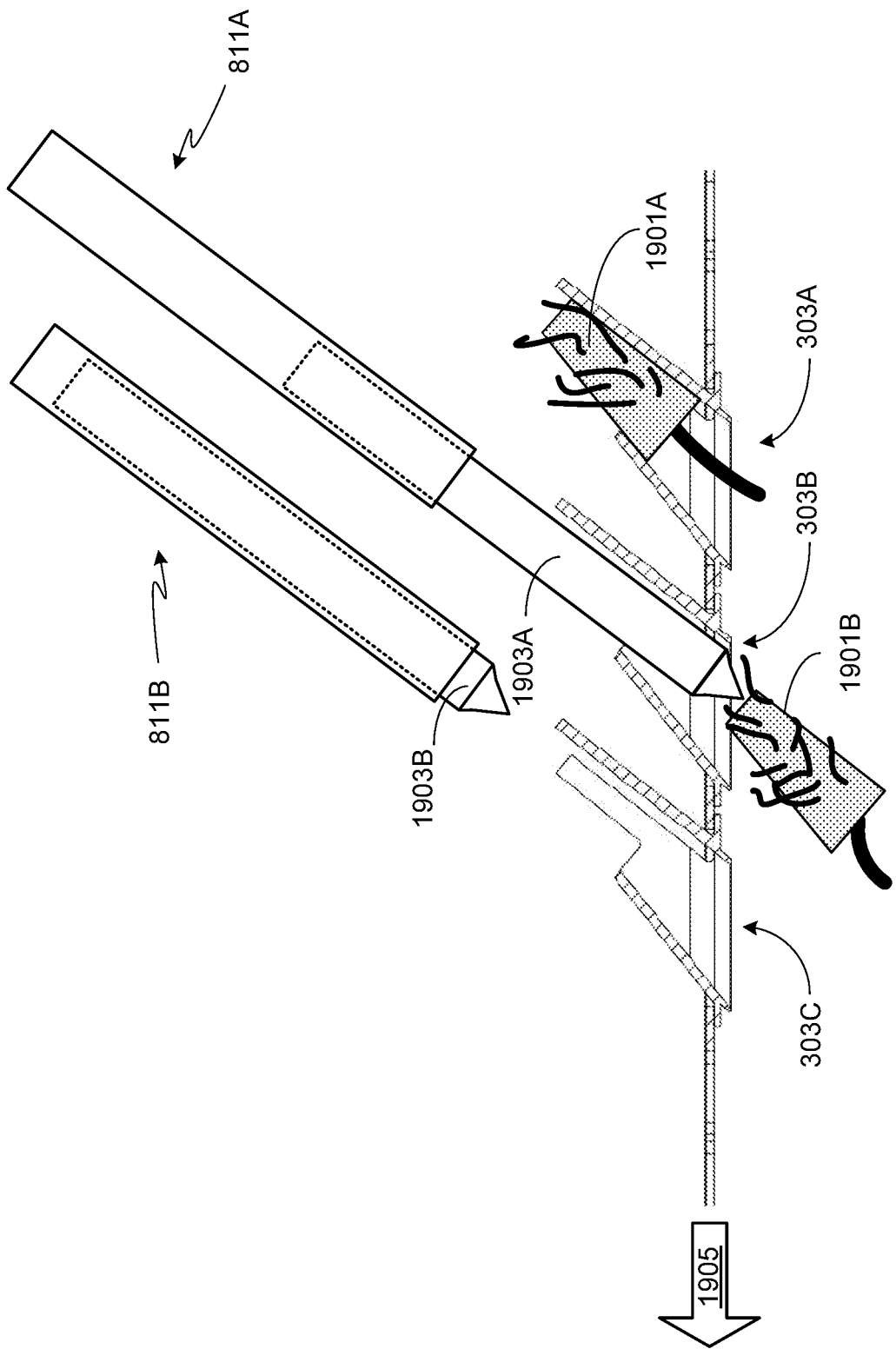
FIG. 19 illustrates operation of the plunger unit.

FIG. 19 provides a simplified side view of the plunger unit of the present invention, this figure illustrating operation of the plunger unit. In this figure plant containers 303A-303C are shown in cross-section with plant container 303A still full of growth media and plant material 1901A; plant container 303B in the process of being emptied of growth media and plant material 1901B; and plant container 303C already emptied of growth media and plant material. As shown, plunger 1903A is in the extended position, thereby forcibly expelling the growth media and plant material 1901B contained within plant container 303B. In contrast, plunger 1903B is shown in the withdrawn position. Note that in this figure, the tower is being driven through the cleaning system in a direction 1905.

Figure 20A:
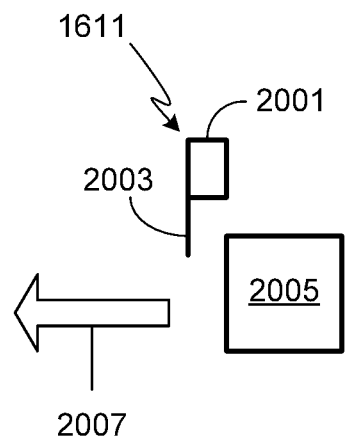
FIGS. 20A-20D illustrate operation of the plant container position sensor that is used to trigger operation of the corresponding plunger unit.
Figure 20B:
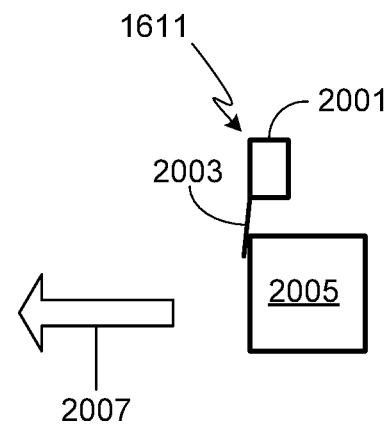
Figure 20C:
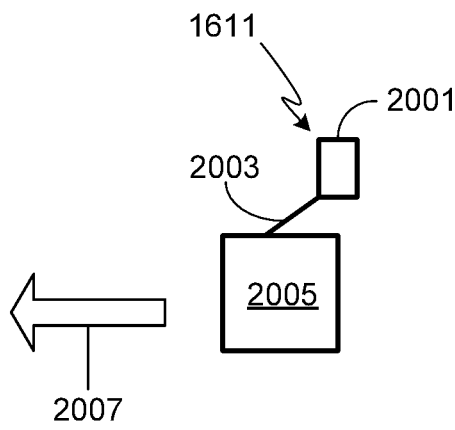
Figure 20D:
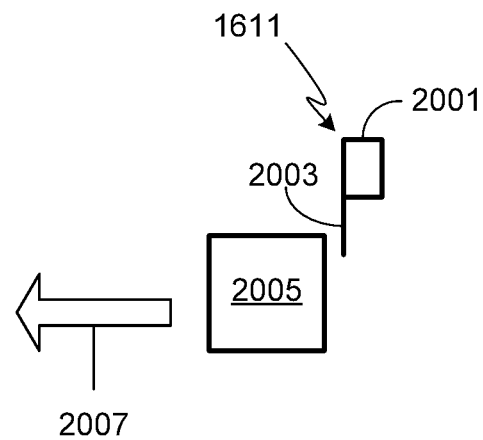

In order to correctly operate the plunger unit, a controller monitors the position of the plant containers as the tower passes through the cleaning system. By monitoring the position of the plant containers relative to the plunger units, the controller is able to correctly activate the plunger when the plant container is optimally located. FIG. 16 shows that there is a first position sensor unit 1611A proximate to plunger unit 811A, and a second position sensor unit 1611B proximate to plunger unit 811B. Although the position sensor units can utilize any of a variety of common position sensing technologies (e.g., optical, capacitive, etc.), the inventors have found that mechanical position sensors perform best when taking into account the cleaning system environment (i.e., towers covered with growth media, plant debris, moisture, etc.). FIGS. 20A-20D illustrate the operation of the preferred configuration for the plant container sensor. In these figures, sensor 1611 is comprised of a sensor switch 2001 and a sensing member 2003. FIG. 20A shows a plant container 2005 approaching the position sensor. As the plant container moves forward in a direction 2007, an edge of the plant container hits sensing member 2003 (FIG. 20B). As plant container 2005 continues to move forward, sensing member 2003 continues to rotate about sensor switch 2001, eventually rotating far enough to trigger the switch (FIG. 20C). At this point the plunger unit that corresponds to this particular position sensor is activated. Then, as plant container 2005 continues to move forward, the sensing member rotates back to the sensor's initial, pre-strike position (FIG. 20D), ready to sense the passing of the next plant container.

The last stage of the cleaning system is air blower 813. Air blower 813 directs a jet of air 1613 towards the passing tower, thereby blowing off growth media and plant material that may have come to rest on a portion of the tower after the brushing and plunging operations. Preferably after the tower passes through the cleaning system, it passes through a washer that washes the tower and attached plant containers prior to the plant containers being replanted.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A plant support tower cleaning system configured to clean a plant support tower, said plant support tower for holding a plurality of plant containers, each of said plant containers for holding plant material and having a first side having a first opening and a second, opposite side having a second opening, said tower cleaning system comprising:
an actuator configured to propel said plant support tower through said tower cleaning system;
a rotating structure having circumferential outward-pointing projections for contacting said plant material in at least one of said plant containers, and for tearing said plant material; and
a second structure, different from the rotating structure, having at least one projection for pushing against said plant material from said first side to facilitate expulsion of said plant material from said second opening of said at least one plant container.

2. The tower cleaning system of claim 1, further comprising an air blower, said air blower configured to direct a jet of air towards said tower after said tower has passed said rotating structure and said second structure as said tower is propelled through said tower cleaning system.

3. The tower cleaning system of claim 1, wherein said rotating structure comprises a first rotating brush.

4. The tower cleaning system of claim 3, wherein said rotating structure comprises a second rotating brush configured to brush an outside surface of a first tower faceplate.

5. The tower cleaning system of claim 1, said second structure comprising a plunger, wherein said plunger is configured to controllably alternate between a withdrawn position and an extended position, wherein said plunger in said extended position extends at least partially into said at least one plant container as said tower is propelled through said tower cleaning system.

6. The tower cleaning system of claim 5, further comprising a plant container position sensor, said plant container position sensor configured to monitor a position of said at least one plant container relative to said plunger and to activate said plunger as said at least one plant container is aligned with said plunger, wherein said plunger extends said plunger when activated.

7. The tower cleaning system of claim 5, wherein said plunger of said second structure is pneumatically driven.

8. The tower cleaning system of claim 1, further comprising a plurality of idler component surfaces, said plurality of idler component surfaces comprised of at least one upper idler component surface configured to limit upward motion of a first tower face plate as said tower is propelled through said tower cleaning system, said plurality of idler component surfaces further comprised of at least one lower idler component surface configured to limit downward motion of said first tower face plate as said tower is propelled through said tower cleaning system.

9. The tower cleaning system of claim 8, said at least one upper idler component surface comprising a first upper idler component surface located before said rotating structure with respect to a direction of propulsion of the tower, a second upper idler component surface located after said rotating structure and before said second structure, and a third upper idler component surface located after said second structure; and said at least one lower idler component surface comprised of a first lower idler component surface located before said rotating structure, a second lower idler component surface located after said rotating structure and before said second structure, and a third lower idler component surface located after said second structure.

10. The tower cleaning system of claim 1, said tower further comprising:
   a first modified V-shaped groove running along the length of a first side of a tower body, said first modified V-shaped groove comprising a first inner groove wall, a first sloped groove wall coupling a first edge of said first inner groove wall to a first edge of said first side of said tower body, and a second sloped groove wall coupling a second edge of said first inner groove wall to a second edge of said first side of said tower body; and
   a second modified V-shaped groove running along the length of a second side of said tower body, said second modified V-shaped groove comprising a second inner groove wall, a third sloped groove wall coupling a first edge of said second inner groove wall to a first edge of said second side of said tower body, and a fourth sloped groove wall coupling a second edge of said second inner groove wall to a second edge of said second side of said tower body.

11. The tower cleaning system of claim 10, said first inner groove wall substantially parallel to said first side of a tower body and substantially perpendicular to a first tower cavity rear wall, and said second inner groove wall substantially parallel to said second side of said tower body and substantially perpendicular to said first tower cavity rear wall.

12. The tower cleaning system of claim 10, wherein said tower is a dual-sided tower, wherein a tower body also defines a second tower cavity, said tower further comprising:
   a second tower face plate, wherein said second tower face plate is hingeably coupled to said tower body, wherein said second tower face plate is positionable relative to said tower body in at least a second tower cavity closed position and a second tower cavity unclosed position;
   a second rotating structure having circumferential outward-pointing projections that, when positioned to contact plant material in at least one plant container of a second plurality of plant containers in said tower, causes tearing of said plant material in said at least one plant container of said second plurality of plant containers in said tower as said tower is propelled through said tower cleaning system; and
   a third structure having at least one projection that, when positioned to contact said plant material in said at least one plant container of said second plurality of plant containers, pushes said plant material in said at least one plant container of said second plurality of plant containers to facilitate expulsion of said plant material from said at least one plant container of said second plurality of plant containers as said tower is propelled through said tower cleaning system.

13. The tower cleaning system of claim 1, wherein the actuator is a motor.

14. The tower cleaning system of claim 1, wherein the rotating structure comprises a wheel.

15. The tower cleaning system of claim 1, further comprising said plant support tower, said tower comprising (i) a tower body, said tower body defining at least a first tower cavity, and (ii) a first tower face plate, wherein said first tower face plate is hingeably coupled to said tower body, and said first tower face plate is positionable relative to said tower body in at least a first tower cavity closed position and a first tower cavity unclosed position, and (iii) said first tower face plate includes said first plurality of plant containers.

16. The tower cleaning system of claim 1, further comprising said plant support tower.

\* \* \* \* \*